United States Patent Office 3,846,217
Patented Nov. 5, 1974

3,846,217
POSTFORMABLE THERMOSET RESIN CONTAINING FIBROUS LAMINATE AND PROCESS OF POSTFORMING THE SAME
Gene Edward Grosheim, Cincinnati, Ohio, assignor to Formica Corporation, Cincinnati, Ohio
No Drawing. Continuation of abandoned application Ser. No. 609,756, Jan. 17, 1967. This application June 2, 1972, Ser. No. 259,162
Int. Cl. D06g 1/00
U.S. Cl. 161—88            12 Claims

ABSTRACT OF THE DISCLOSURE

A thermoset resin containing fibrous laminate which can be postformed by first applying a layer of a substantially strain-resistant, slip-resistant non-extensible adhesive material to at least one of the broad sides of said laminate and postforming the laminate so as to be mountable on a multi-planar group of contiguous surfaces and removing the non-extensible material from the surface of the laminate after the postforming operation is completed.

CROSS-REFERENCE TO RELATED APPLICATION

This application is a continuation of my earlier application, U.S. Ser. No. 609,756 filed Jan. 17, 1967, now abandoned.

THE BACKGROUND OF THE INVENTION

Decorative and industrial laminated articles prepared from layers of paper impregnated with thermosetting resins that are subsequently heat and pressure consolidated to the thermoset unitary structure state are often required to have a postforming capability that will enable one to alter the contours of the flat laminate so as to render them applicable to a base having a plurality of planes contiguously. The present invention provides a process whereby the postforming of the thermoset resin containing fibrous laminate can readily be accomplished by applying a layer of a substantially strain-resistant, slip-resistant non-extensible adhesive material to at least one of the broad sides of said laminate in the area where postforming is to be accomplished and after postforming said layer is readily removable from said laminate.

FIELD OF THE INVENTION

The present invention is in the field of decorative and industrial laminated articles which are the heat and pressure consolidated unitary structures of a plurality of fibrous paper sheets impregnated with thermosetting resins which resins are converted to the thermoset state during the consolidation step. Laminates of this description frequently need to be postformed prior to installation in order that they can conform to the contours of the base onto which it is to be installed which base has a plurality of contiguous planes.

DESCRIPTION OF THE PRIOR ART

The National Electrical Manufacturer's Association (NEMA) Standards Publication for laminated themosetting decorative sheets is described in Method LD 1–2.11. Although a plurality of different postforming techniques have been developed, the U.S. Pat. 3,131,116, Pounds shows laminates of the class used herein and shows the postforming of the same. This patent is incorporated herein by reference.

THE SUMMARY OF THE INVENTION

This invention relates to a thermoset resin impregnated fibrous sheet containing laminate and, more particularly, a melamine-formaldehyde resin containing decorative or industrial laminate carrying on at least one of its broad sides a layer of a substantially strain-resistant, slip-resistant non-extensible adhesive material which is readily removable from said laminate. Still further, this invention relates to the preparation of a conventional decorative laminate surfaced with a thermoset resin and, more particularly, a thermoset melamine-formaldehyde resin which is rendered readily postformable by the application to the decorative side of said laminate a layer of a substantially strain-resistant, slip-resistant non-extensible dry adhesive material, which non-extensible material is permitted to remain on the surface of said laminate at least in the area at which deformation or postforming is to be accomplished and after said deformation said non-extensible material is removed from the laminate. Still further, this invention relates to a process for postforming a decorative laminate surfaced with a thermoset melamine-formaldehyde resin by applying to the decorative side of said laminate a layer of substantially strain-resistant, slip-resistant non-extensible adhesive material, particularly in the area in which the deformation is to take place, deforming the laminate in the selected area and, thereafter, removing the non-extensible material from the laminate wherein said non-extensible layer is of substantially uniform thickness and covers said laminate from edge to edge in at least one direction.

The present invention is applicable to all conventional laminates which contain a plurality of thermoset resin impregnated paper sheets. For the sake of simplicity and expediency these laminates will sometimes be referred to hereinbelow as melamine resin laminates since these are the preferred laminates.

One of the objects of the present invention is to provide a means for deforming decorative laminates which are surfaced with a thermoset melamine-formaldehyde resin may be deformed through an arc of comparably small radius by applying to the decorative side of said laminate a layer of a substantially strain-resistant, slip-resistant non-extensible adhesive material at the point of deformation, and after the deformation step has been accomplished, removing the non-extensible material from the surface of the laminate. These and other objects of the present invention will be discussed in greater detail hereinbelow.

Decorative laminates are a standard article of commerce and have been manufactured and marketed for a substantial plurality of years. Among the best known and most popular decorative laminates are those which are surfaced with a melamine-formaldehyde resin that has been converted by the application of heat and pressure to a thermoset state. In the preparation of these laminates, it is conventional to assemble in superimposed relationship a plurality of core sheets which are prepared by impregnating Kraft paper with a thermosetting phenolic resin and drying the thus impregnated sheets without significantly advancing the cure of the thermosetting phenolic resins. There is then superimposed on the assembled stack of core sheets a decorative sheet which has been impregnated with a thermosetting melamine-formaldehyde resin. The decorative sheet may be a solid color, such as any of the pastel colors, such as pink, yellow, white, and the like, or the decorative sheet may carry a printed design which may be a geometric pattern, a marbleized effect, a floral pattern, or a wood grain print, and the like. The paper selected for the decorative sheet is generally an α-cellulose sheet of high quality, and when a decorative print sheet is used as the decorative sheet, it is generally conventional to superimpose above the print sheet an overlay sheet which is also α-cellulose paper impregnated with a thermosetting melamine-formaldehyde resin. The total assembly is then inserted into a press between a pair of stainless steel press plates and the whole assembly is heat and pressure consolidated to a unitary structure. During this operation, when an overlay sheet is utilized, the heat and pressure converts the overlay sheet to a transparent layer so that the print in the print sheet can readily be seen through the overlay sheet.

The postforming of decorative laminates of the class described has been accomplished in the past, which postforming permits the adaptation of a laminate to the contours of the base to which the laminate will be cemented. These laminates have been used to provide surfaces for kitchen countertops, furniture, including tables, chairs, benches, and the like, or vanity tops for bathroom counters. Certain of the decorative laminates being marketed today are classified as non-forming grades while others are classified as forming grades.

The non-forming or general purpose laminates are so designated because they are utilized on relatively flat surfaces and are not expected to bend even with heating to less than about a 3" or 4" radius. In contrast, the forming grade of laminate is generally expected to form at or to less than a one (1) inch radius. Because of this fundamental difference in requirement, the two grades oftentimes utilize different components and processing conditions. In the above general discussion of laminate preparation, the non-forming grade will oftentimes use core sheets impregnated with thermosetting phenol-formaldehyde resins which impart excellent resistance to dimensional change. Special formulations of melamine-formaldehyde resin are used which further enhance selected properties. During the pressing operation the laminate is consolidated at relatively high temperatures to insure complete curing.

The core sheets of forming grades of laminates generally contain flexible, slow curing phenol-formaldehyde resins. Many of the core layers are of "extensible" or "creped" paper. Pressing temperatures and duration of time at the higher pressing temperatures are minimized to further promote the formability property. As a further aid to formability, the forming grades are reduced to .051" thickness instead of the .062" for the non-forming grade.

The differences in properties are sufficiently recognized that the National Electrical Manufacturers Association Standards Publication No. LD 1–1964 lists separate performance requirements for the two grades. Listed below are some of the more graphic differences in requirements as listed by NEMA.

| Test method | General purpose type (non-forming grade) | Postforming type |
|---|---|---|
| Thickness and tolerance (LD1-3.02). | 0.062"±0.005" | .051"±0.004". |
| Resistance of surface to cigarette burns (LD1-2.04). | 110 seconds | 75 seconds. |
| Immersion in boiling water (LD1-2.07). | 10% max gain in wt. or thickness. | 12% max. gain in wt. or thickness |
| Dimensional change (LD1-2.08). | {0.5% max. length {0.9% max. cross | {1.1% max. length. {1.4% max. cross. |
| Flexural strength (LD1-2.09). | 18,000 p.s.i. min | {15,000 min. length. {12,000 min. cross. |
| Resistance to impact (LD1-2.15). | 36" min | 24" min. |
| Formability (LD1-2.11) | No requirement cited | ¾". |

The process of the present invention will impart vastly improved postforming characteristics to decorative laminates of both the forming grades and the previously considered non-forming laminates. This newly developed method has the additional novel feature in that the techniques of the invention can be utilized even after the laminate has been trimmed in size, sanded, and given a final surface finish. The non-extensible material that is applied to the decorative side of the laminate may be applied over the entire surface of the laminate or it may be applied selectively in that area only in which postforming is to be carried out. Generally speaking, the process is carried out by selecting a finished laminate and coating the decorative side thereof with a solution of said non-extensible material and drying the thus coated surface so as to remove the solvent, thereby leaving on the decorative side of the laminate a dry layer of a substantially strain-resistant, slip-resistant non-extensible adhesive material which retards laminate surface stretch during deforming and which is readily removable from the laminate after the postforming step has been accomplished. One of the preferred embodiments of the present invention resides in coating the laminate surface with a relatively non-extensible adhesive in which there is embedded a relatively non-extensible layer of cloth, paper or film in the adhesive, allowing the layer to dry, postforming the laminate to the desired radius and then using an appropriate solvent for the adhesive so as to remove the adhesive and embedment so as to expose the finished postformed decorative laminate.

The primary criteria for any of the surfacing mechanisms is that they must retard laminate surface stretch during the forming step. If the laminate surface does not stretch far enough to craze or crack, the core of the laminate will undergo compression or other distortions which will result in a successful postformed article devoid of any crazing or cracks. The relationship between the properties of the non-extensible system, the bending radius, and the stiffness of the laminate at the time of forming, will be discussed in greater detail hereinbelow. It should be readily apparent that small radii and stiff laminates induce considerable tension on the convex surface during a postforming operation, thus requiring a strong non-extensible system (see Examples 1, 3 and 4, non-forming grades). However, relatively weak non-extensible systems when added to the surfaces of certain laminates will oftentimes be sufficient for most postforming operations (see Examples 11, 16 and 27, forming grade). In deforming the laminate, concave or convex deformations can be accomplished; however, in such deformations the concave surface is not subjected to very high tension forces. It is generally recognized that even the stiff, non-formable grades of laminates will readily form to small inside or concave radii while failing to form to desirable outside or convex radii. Because the outside or convex radii are the more difficult to achieve, the examples and discussion set forth relate only to convex forming radii.

In order that the concept of the present invention may be more completely understood, the following examples are set forth illustrating the invention and comparing it with prior techniques. These examples are set forth primarily for the purpose of illustration and any specific enumeration of detail contained therein should not be construed as a limitation on the case except as is indicated in the appended claims. In these examples, there is used commercially available phenolic core-melamine resin surfaced laminates as described hereinabove.

EXAMPLE 1

Two sets of samples identified as "A" and "B" were cut from the same white solid color commercially available postforming laminate. This type of laminate is generally regarded as having marginal postforming properties. The "A" samples were preserved for testing in their original state, whereas the "B" samples were coated at the site selected for postforming with a water soluble mucilage into which has been embedded a layer of glass cloth. The mucilage is allowed to dry before testing. The testing of the postforming of the samples was then accomplished in accordance with the Method LD 1–2.11 contained in the National Electrical Manufacturers Association (NEMA) Standards Publication for laminated thermosetting decorative sheets. When subjected to this prescribed test, the "A" samples failed to form a radius of less than 14/16", but could be considered acceptable at the 14/16" radius. On the other hand, the "B" samples with their added non-extensible layer postformed to a radius of 1/16" without displaying any signs of crazing or cracking. This was evident upon the removal of the glass cloth mucilage layer.

EXAMPLE 2

Two sets of samples "C" and "D" were cut from a piece of a printed pattern, postforming laminate. This type of laminate is generally regarded as having superior postforming properties. The "C" samples were preserved in their original state for testing, whereas the "D" samples received a surface treatment of a water soluble mucilage having embedded therein glass cloth. The mucilage, glass cloth layer was positioned at the site of the contemplated postforming and the mucilage was allowed to dry before testing. When subjected to the NEMA test, the "C" samples failed to form at a radius less than 9/16", but could be considered acceptable at the 9/16" radius. On the other hand, the "D" samples with their added non-extensible layer postformed to a 0" radius. Upon removal of the mucilage glass cloth layer from the "D" laminate, no visible signs of crazing or cracking were to be found.

As described hereinabove, non-forming laminates of solid colors and printed patterns are produced under conditions which are designed to provide an optimum in the properties of dimensional stability, impact resistance, heat resistance, and the like. The optimization of these properties has involved the use of materials and processing conditions which heretofore have not resulted in a postformable laminate of a commercially acceptable quality. This is illustrated hereinbelow.

EXAMPLE 3

Two sets of samples "E" and "F" were cut from the same piece of a white solid color non-forming laminate. The samples "E" were preserved in their original state for testing as a control, whereas the "F" samples received a surface treatment as in each of the samples "B" and "D." When the mucilage glass cloth layer is dried, the two sets of samples are subjected to the prescribed test. The "E" samples failed to form at a radius of less than 2½", whereas the "F" samples with the added non-extensible layer formed to a radius of 5/16".

Similar results were obtained using gum arabic as the adhesive instead of the mucilage. Gum arabic is an exudate from the acacia Senegal tree. The mucilage used in the first three samples is a commercially available adhesive from Le Page, Inc., and its contents are of a proprietary nature. By the same token, the reinforcing glass cloth member is commercially available from a plurality of sources. Other reinforcing members may readily be used such as canvas, linen, cotton fabrics, synthetic fiber fabrics, and the like.

In addition to the non-extensible materials used in the preceding examples, one may use any one of a substantial plurality of materials capable of producing a strain-resistant, slip-resistant non-extensible layer such as methyl cellulose, polyvinyl alcohol, hydroxyethyl cellulose, sodium alginate, polyvinyl acetate adhesive, ghatti gum, starch, egg albumin, masking tape, pressure sensitive tape, and the like.

The general procedures of the first three examples were repeated a plurality of times utilizing in each series a layer of a substantially strain-resistant, slip-resistant non-extensible material on the decorative side of commercially available decorative laminates surfaced with a thermoset melamine-formaldehyde resin. These results are shown in the Examples 4–29, inclusive, the results of which are shown in Table I hereinbelow. With each series of laminates tested, there were two principal categories, the solid color non-forming grade and the solid color forming grade. In each of these two principal categories, one laminate had the coating applied whereas the identical laminate without a coating was used as a control. The successful forming radius measured in 64ths of an inch are shown in the table. It will be noted that many of the coatings listed in Table I contain no reinforcement, although the use of reinforcement increases the effect even further (compare Example 6 with 22, 7 with 23). It will be further noted that the more inextensible the restraining layer, the more pronounced is the effect. For instance, the mucilage of Example 4 is superior to the polyvinyl acetate of Example 14 and the rubber base cement of Example 19. Nevertheless even these latter materials enhance postforming to some degree.

TABLE I

| Ex. | Surface coating | Solid color non-forming grade | | Solid color forming grade | |
|---|---|---|---|---|---|
| | | With coating | Control (no coating) | With coating | Control (no coating) |
| 4 | Mucilage | | | 11 | 50 |
| 5 | Gum arabic | 108 | 160 | | |
| 6 | Sodium carboxymethyl cellulose, ~mol. wt. 100,000. | 59 | 144 | 15 | 64 |
| 7 | Sodium carboxymethyl cellulose, ~mol. wt. 70,000. | 66 | ~160 | 30 | 48 |
| 8 | Sodium carboxymethyl cellulose, ~mol. wt. 200,000. | 88 | ~160 | 26 | 39 |
| 9 | Water soluble methylcellulose. | | | 28 | 38 |
| 10 | Polyvinyl alcohol | 95 | ~160 | 24 | 54 |
| 11 | Non-ionic water soluble cellulose ether. | 110 | 117 | 42 | 54 |
| 12 | Hydroxyethyl cellulose | 117 | ~160 | 40 | 42 |
| 13 | Sodium alginate | 86 | ~160 | 32 | 38 |
| 14 | Polyvinyl acetate adhesive | | | 43 | 55 |
| 15 | Ghatti gum | 105 | ~160 | 36 | 54 |
| 16 | Starch (Eclipse F) | 114 | ~160 | 31 | 52 |
| 17 | Gelatin | 63 | ~160 | 24 | 46 |
| 18 | Albumin (egg) | <56 | ~160 | 8 | 44 |
| 19 | Contact cement (rubber base). | 115 | ~160 | 40 | 44 |
| 20 | Mucilage and medium glass cloth. | 14 | 160 | 4 | 56 |
| 21 | Gum Arabic and medium glass cloth. | | | 14 | 50 |
| 22 | Sodium carboxymethyl cellulose, ~mol. wt. 100,000 and medium glass cloth. | | | 6 | 58 |
| 23 | Sodium carboxymethyl cellulose, ~mol. wt. 70,000 and medium glass cloth. | | | 14 | 42 |
| 24 | Sodium carboxymethyl cellulose, ~mol. wt. 200,000 and medium glass cloth. | | | 6 | 40 |
| 25 | Sodium carboxymethyl cellulose and fine steel screen. | | | <12 | 47 |
| 26 | Sodium carboxymethyl cellulose and medium weight canvas cloth. | | | 40 | 55 |
| 27 | Masking tape | 128 | ~160 | 32 | 46 |
| 28 | Pressure sensitive tape | 110 | ~160 | 31 | 44 |
| | | | | Printed pattern forming grade | |
| 29 | Mucilage and medium glass cloth. | | | 0 | 6 |

The following examples are illustrative of the applicability of the concept of the present invention to other decorative laminates which have in the decorative surface layer thermoset resins other than melamine-formaldehyde resins. In each instance, the conventional core sheets are prepared which have been preimpregnated with a thermosetting phenolic resin and then a surface layer of paper is superimposed above the core sheets with a thermoset resin different from melamine-formaldehyde resins and the entire assembly is heat and pressure consolidated into a unitary structure. In all instances, the restrictive matrix was comprised of an adhesive layer prepared by blending 1 part of ethylene glycol with 10 parts of a commercially available mucilage. Into this was embedded a layer of medium weave glass cloth. The restrictive matrix was allowed to dry before practicing the process of the present invention. The test values set forth in the table hereinbelow are in 64ths of an inch. These measurements refer to outside bending. There was used in one surface a conventional thermosetting phenolic resin and in another instance a thermosetting diallyl phthalate cross-linkable polymer. The other resinous materials are identified hereinbelow in the table.

TABLE II

| Surface resin | Postforming test values | |
|---|---|---|
| | Control (no coating) | With restrictive matrix |
| Phenolic | 28 | 16 |
| Polyester [1] | 80 | 64 |
| Acrylic (thermosetting type) [2] | 80 | 54 |
| Thermoplastic polyblend [3] | 80 | 64 |
| Diallyl phthalate (poly) | 54 | 41 |

[1] Prepared according to U.S.P. 3,294,620.
[2] Prepared according to U.S.P. 3,218,225.
[3] A phenolic core, melamine resin impregnated print sheet surfaced with a 50/50 blend of poly(methyl methacrylate) and poly(vinylidene fluoride).

It should be noted that in the examples contained in Table II, there are illustrated a plurality of decorative laminates, namely, the polyester, the acrylic, the thermoplastic polyblend and the diallyl phthalate. The phenolic resin-containing laminate may be used in industrial applications, if desired, and, therefore, the concept of the present invention is applicable to industrial laminates.

It should further be noted that the thermosetting resin-containing laminate need not necessarily have a thermosetting resin on its surface but, instead, may have a thermoplastic polymeric sheet bonded to the thermosetting resin-containing laminate which thermoplastic film may be a homopolymer of methyl methacrylate, ethyl methacrylate and the like or copolymers of methyl methacrylate or ethyl methacrylate with minor amounts such as 1 to about 10% of ethyl acrylate, and the like.

In the Table II, there is illustrated a decorative laminate that is particularly suited for outdoor applications having very pronounced resistance to a wide variety of weathering conditions which thermoplastic film is prepared by physically blending about equal parts of poly(methylmethacrylate) or poly(ethylmethacrylate) with a polymer of vinylidene fluoride, then preparing a homogeneous uniformly thick film from the blend, and applying it to the laminate assembly and then heat and pressure consolidating the entire assembly into a unitary structure. If desired, one may use between about 90% and about 40%, by weight of a polymer of a monomer selected from the group consisting of methyl methacrylate and ethyl methacrylate and correspondingly from about 10% to about 60%, by weight, of a polymer of vinylidene fluoride wherein said percentages, by weight, are based on the total weight of the blend and, in all instances, add up to 100%.

I claim:

1. A decorative laminate comprising a plurality of fibrous core sheets and a fibrous decorative sheet which are impregnated with a thermoset resin and which have been heat and pressure consolidated into a unitary structure, said laminate having coated on at least one of its broad surfaces, whereat postforming is to be effected, a substantially uniformly thick coating consisting essentially of a substantially strain-resistant, slip-resistant, non-extensible dry adhesive material which retards laminate surface stretch during deforming, has a reinforcing layer embedded therein and is readily removable from said surface, wherein said coating covers said laminate substantially from edge to edge in at least one direction, said laminate being capable of being postformed through a radius of between about 0" and 1" in the area of said coating without displaying any signs of crazing or cracking upon removal of said coating therefrom.

2. A laminate according to Claim 1 in which said non-extensible material is polyvinyl alcohol.

3. A laminate according to Claim 1 in which the non-extensible material is mucilage.

4. A laminate according to Claim 1 in which the non-extensible material is gum arabic.

5. A decorative laminate comprising a plurality of fibrous core sheets and a fibrous decorative sheet which are impregnated with a thermoset resin and which have been heat and pressure consolidated into a unitary structure, said laminate having coated on at least one of its broad surfaces, whereat postforming is to be effected, a substantially uniformly thick coating consisting essentially of a substantially strain-resistant, slip-resistant, non-extensible dry adhesive material which retards laminate surface stretch during deforming, is readily removable from said surface and is selected from the group consisting of gelatin, polyvinyl alcohol, methyl cellulose, hydroxyethyl cellulose and a carboxymethyl cellulose, wherein said coating covers said laminate substantially from edge to edge in at least one direction, said laminate being capable of being postformed through a radius of between about 0" and 1" in the area of said coating without displaying any signs of surface crazing or cracking upon removal of said coating therefrom.

6. A process for postforming a decorative laminate comprised of a plurality of fibrous core sheets and a fibrous decorative sheet which are impregnated with a thermoset resin and which have been heat and pressure consolidated into a unitary structure which comprises coating at least one of the broad surfaces of said laminate, whereat postforming is to be effected, with a solution of a substantially uniformly thick coating consisting essentially of a substantially strain-resistant, slip-resistant, non-extensible adhesive material which retards laminate surface stretch during deforming and is selected from the group consisting of gelatin, polyvinyl alcohol, methyl cellulose, hydroxyethyl cellulose and a carboxymethyl cellulose, allowing the coating to dry, postforming the laminate at the area with said non-extensible material thereon to a radius of between about 0" and 1", and thereafter removing said coating from said laminate, whereby said postformed laminate displays no signs of crazing or cracking after the removal of the non-extensible layer.

7. A laminate according to Claim 5 in which the non-extensible material is a polyvinyl alcohol adhesive.

8. A laminate according to Claim 5 in which the non-extensible material is gelatin.

9. A laminate according to Claim 5 wherein said non-extensible material is sodium carboxymethyl cellulose.

10. A laminate according to Claim 5 wherein said non-extensible material is methyl cellulose.

11. A laminate according to Claim 5 wherein said non-extensible material is hydroxyethyl cellulose.

12. A process for postforming a decorative laminate comprised of a plurality of fibrous core sheets and a fibrous decorative sheet which are impregnated with a thermoset resin and which have been heat and pressure consolidated into a unitary structure which comprises coating at least one of the broad surfaces of said laminate, whereat postforming is to be effected, with a solution of a substantially uniformly thick coating consisting essentially of a substantially strain-resistant, slip-resistant non-extensible adhesive material which retards laminate surface stretch during deforming, embedding a reinforcing layer in said coating, allowing said coating to dry, postforming the laminate at the area with the reinforced coating thereon and thereafter removing said reinforced coating from said laminate, whereby said postformed laminate displays no signs of crazing or cracking after the removal of the coating.

(References on following page)

References Cited

UNITED STATES PATENTS

| | | | |
|---|---|---|---|
| 3,041,668 | 7/1962 | Bonza et al. | 264—316 |
| 3,131,116 | 4/1964 | Pounds | 161—258 |
| 3,260,657 | 7/1966 | Hogan | 264—316 |
| 2,631,955 | 3/1953 | Muskat | 161—Dig. 004 |
| 3,700,611 | 10/1972 | Nickerson et al. | 260—41 A |

GEORGE F. LESMES, Primary Examiner

J. J. BELL, Assistant Examiner

U.S. Cl. X.R.

117—6; 156—222, 247, 344; 161—Dig. 004, 92, 93, 167, 229, 250, 263, 268